(12) United States Patent
Her et al.

(10) Patent No.: US 7,573,539 B2
(45) Date of Patent: Aug. 11, 2009

(54) LIQUID CRYSTAL DISPLAY APPARATUS

(75) Inventors: Yong-Koo Her, Gyeonggi-do (KR); Min-Kyung Jung, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 177 days.

(21) Appl. No.: 11/895,142

(22) Filed: Aug. 22, 2007

(65) Prior Publication Data

US 2007/0296894 A1 Dec. 27, 2007

(30) Foreign Application Priority Data

Dec. 5, 2006 (KR) .................. 10-2006-0121856

(51) Int. Cl.
*G02F 1/136* (2006.01)
(52) U.S. Cl. .................. 349/43; 349/106; 349/107; 349/108
(58) Field of Classification Search .............. 349/43, 349/106–108
See application file for complete search history.

(56) References Cited

U.S. PATENT DOCUMENTS 7,180,559 B2 * 2/2007 Chang et al. ............ 349/106
7,212,262 B2 * 5/2007 Kang ..................... 349/106

FOREIGN PATENT DOCUMENTS

| JP | 2004-246190 | 9/2004 |
| JP | 2005-201953 | 7/2005 |
| JP | 2006-251417 | 9/2006 |

OTHER PUBLICATIONS

Patent Abstracts of Japan, Publication No. 2004-246190, Sep. 2, 2004, 1 p.
Patent Abstracts of Japan, Publication No. 2005-201953, Jul. 28, 2005, 1 p.
Patent Abstracts of Japan, Publication No. 2006-251417, Sep. 21, 2006, 1 p.

* cited by examiner

*Primary Examiner*—David Nelms
*Assistant Examiner*—Phu Vu
(74) *Attorney, Agent, or Firm*—Haynes and Boone, LLP (57) ABSTRACT

A liquid crystal display (LCD) apparatus having a delta-type pixel structure, comprises a thin-film transistor (TFT) substrate, a color filter substrate and a liquid crystal layer. Electrodes on the TFT substrate are configured to block light leakage at boundaries between color filters. Light leakage at the color filter boundaries is blocked without having a black matrix on the color filter substrate.

20 Claims, 6 Drawing Sheets

LIQUID CRYSTAL DISPLAY APPARATUS

CROSS-REFERENCE TO RELATED APPLICATIONS

This application claims the benefit of priority under 35 U.S.C. § 119 to Korean Patent Application No. 2006-121856, filed on Dec. 5, 2006 in the Korean Intellectual Property Office (KIPO), the contents of which are herein incorporated by reference in their entirety.

BACKGROUND OF THE INVENTION

1. Field of the Invention

The present invention relates to a liquid crystal display (LCD) apparatus. More particularly, the present invention relates to an LCD apparatus having an enhanced aperture ratio.

2. Description of the Related Art

In general, a liquid crystal display (LCD) apparatus includes a thin-film transistor (TFT) substrate, a color filter substrate aligned to and attached to the TFT substrate and a liquid crystal layer interposed between the TFT substrate and the color filter substrate.

The TFT substrate includes a plurality of pixels, each pixel being located at the intersection of a gate line and a data line, with each pixel including a TFT, a storage capacitor and a pixel electrode. The TFT substrate further includes driving circuits for independently driving the plurality of pixels. The color filter substrate includes a color filter layer having red (R), green (G) and blue (B) color filters, a black matrix disposed at boundaries of the color filters and a common electrode for establishing electric fields between the common electrode and the pixel electrodes.

Recently, a delta-type pixel structure has been developed. The delta-type pixel structure has better characteristics in color uniformity than a stripe-type pixel structure. In the stripe-type pixel structure, color filters are aligned along the data line in a linear configuration, whereas in the delta-type pixel structure, color filters are aligned along the data line in a zigzag configuration.

In the delta-type pixel structure, a black matrix, located on the color filter substrate at the boundaries of color filters, is aligned to overlap with the gate and data lines in order to prevent light leakage between the color filters.

In the delta-type pixel structure, unlike the stripe-type pixel structure, light leakage occurs at corner portions where the color filters meet. The width of the black matrix disposed at the corner portions is increased to prevent the light leakage. As a result, aperture ratio is reduced. In addition, when the TFT substrate is misaligned with respect to the color filter substrate, brightness is reduced.

SUMMARY

The present invention provides a liquid crystal display (LCD) apparatus having a delta-type pixel structure, in which light leakage at boundaries between pixels is blocked by structures formed in first and second conductive layers on the TFT substrate rather than by black matrix on the color filter substrate. The LCD made in accordance with the invention has an enhanced aperture ratio.

In some embodiments, the color filters are arranged in horizontal lines on the color filter substrate. Each line of filters is offset in the horizontal direction from the adjoining lines of filters by about half the width of a color filter. With this offset, the columns of filters in the longitudinal direction have a zigzag configuration. Data lines follow the zigzag and therefore have horizontal portions as well as vertical portions. The terms horizontal and vertical, as used here, are understood as they apply to the layouts shown in FIGS. 1, 2, 3, and 4 herein.

In the first exemplary embodiment of the present invention, an LCD apparatus includes a thin-film transistor (TFT) substrate, a color filter substrate and a liquid crystal layer. The TFT substrate includes a gate line, a data line intersecting the gate line, a TFT part electrically connected to the gate line and the data line, and a storage capacitor part. At the intersection of the gate line and the data line, the gate line is electrically insulated from the data line by an insulating dielectric layer. The color filter substrate includes color filters of three different colors.

The horizontal boundaries between color filters ideally align with the center lines of gate lines. The vertical boundaries between color filters ideally align with the center lines of vertical portions of data lines on the TFT substrate. A horizontal boundary at which adjacent ones of the color filters meet is overlapped with the gate line which is made sufficiently wide to block the horizontal boundary. Along the vertical boundary, light leakage is blocked by a storage capacitor electrode located beneath a portion the vertical portion of the data line, and by the vertical portion of the data line itself where the storage capacitor electrode is absent, and by the TFT part. Thus light leakage at color filter boundaries is blocked by a gate line, by a storage capacitor electrode under a portion of a data line, by a portion of a data line without an underlying capacitor electrode, and by a TFT part.

The liquid crystal layer is disposed between the TFT substrate and the color filter substrate. The color filters are arranged along the gate line in a linear configuration, and are arranged along the data line in a zigzag configuration.

In a second exemplary embodiment of the present invention, an LCD apparatus includes a TFT substrate, a color filter substrate and a liquid crystal layer. The TFT substrate includes a gate line, a data line intersecting the gate line, a TFT part electrically connected to the gate line and the data line and a storage capacitor part. At the intersection of the gate line and the data line, the gate line is electrically insulated from the data line by a layer of insulating dielectric. The color filter substrate includes color filters of three different colors.

The liquid crystal layer is disposed between the TFT substrate and the color filter substrate. The color filters are arranged along the gate line in a linear configuration, and are arranged along the data line in a zigzag configuration.

The storage capacitor part may include a first lower storage electrode, a second lower storage electrode and an upper storage electrode. The first lower storage electrode may be formed from substantially the same conductive layer as the gate line. The second lower storage electrode may be formed from substantially the same conductive layer as the gate line, and may extend from the first lower storage electrode to the data line and extend beneath the data line. The upper storage electrode may be formed from substantially the same conductive layer as the data line, and may be electrically connected to a drain electrode of the TFT part. Also, the upper storage electrode may overlay a portion of the first lower storage electrode.

Each of the color filters may have a rectangular shape having shorter horizontal sides and longer vertical sides. The longer sides of adjacent ones of the color filters may meet at a first boundary of the color filters. The first boundary may be ideally aligned or overlapped with the data line and may be blocked by the second lower storage electrode on a major portion of the length of the first boundary, and may be blocked over the remainder of its length by a floating electrode, a gate line and a data line. The shorter sides of adjacent ones of the color filters may meet at a second boundary of the color filters, and the second boundary may be ideally aligned or overlapped with the first lower storage electrode and the upper storage. The second boundary may be blocked by the first lower storage electrode and the upper storage electrode. Three color filters may meet at a point on the second boundary, the point being called a third boundary of the color filters, The third boundary may be blocked by the upper storage electrode and the first lower storage electrode. Alternatively, the third boundary may be blocked by an area at which the first and second lower storage electrodes meet. The floating electrode is formed between the data line and the upper storage electrode in order to block an otherwise exposed portion of the first boundary.

In the LCD apparatus of the present invention, the aperture ratio of the delta-type pixel structure is increased by using structures on a TFT substrate to block stray light at color filter boundaries, thereby enhancing the brightness of the LCD apparatus.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
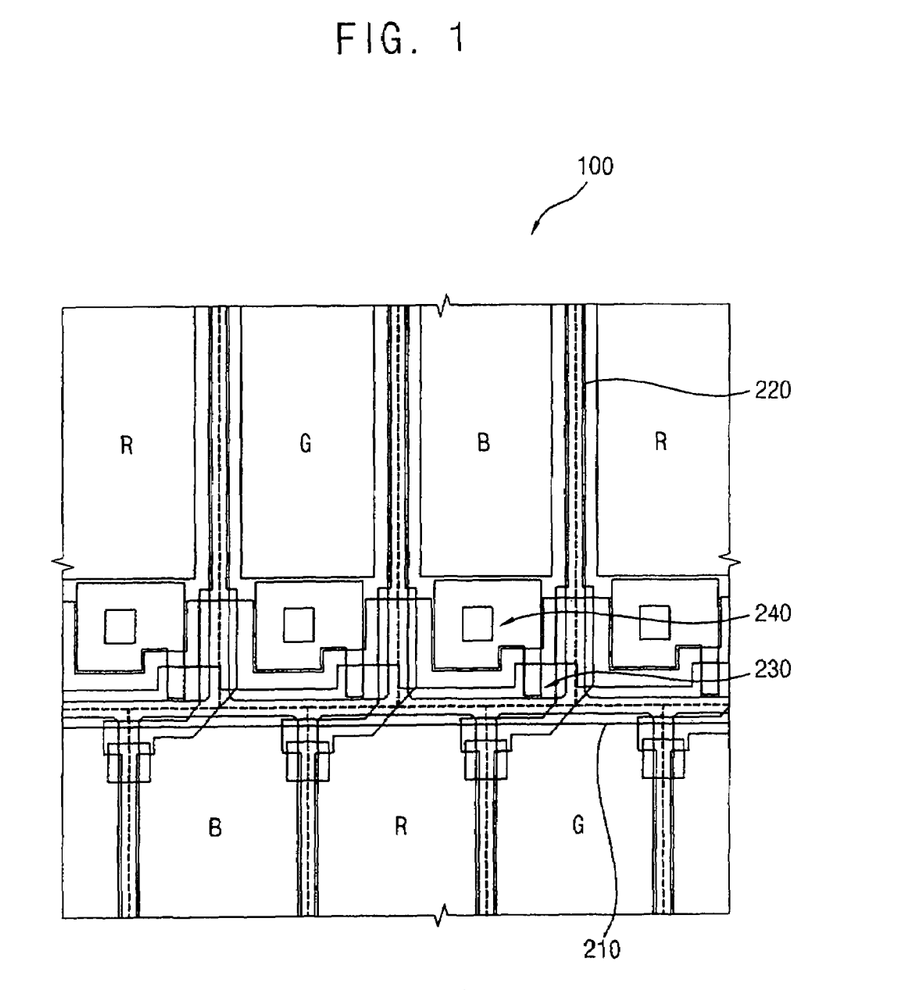
FIG. 1 is a layout illustrating a portion of a liquid crystal display (LCD) apparatus in accordance with an exemplary embodiment of the present invention.
Figure 2:
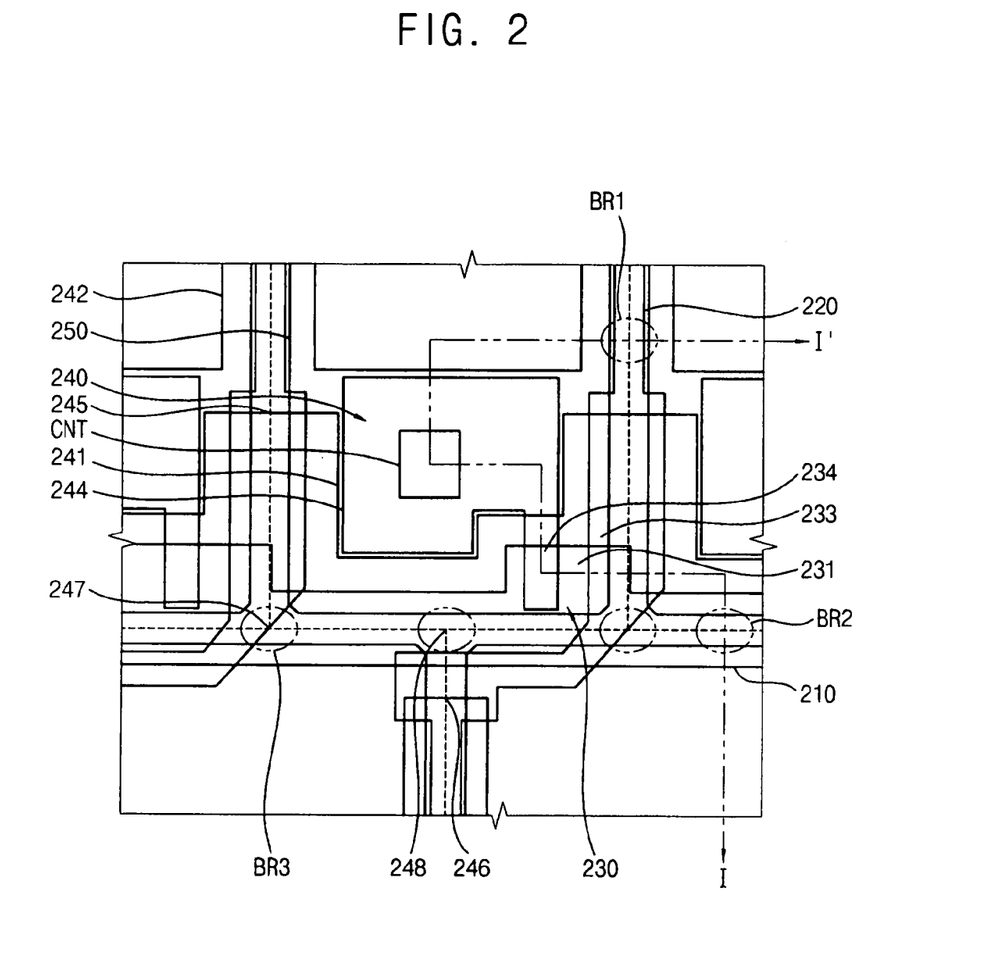
FIG. 2 is an enlarged view illustrating the LCD apparatus of FIG. 1.
Figure 3:
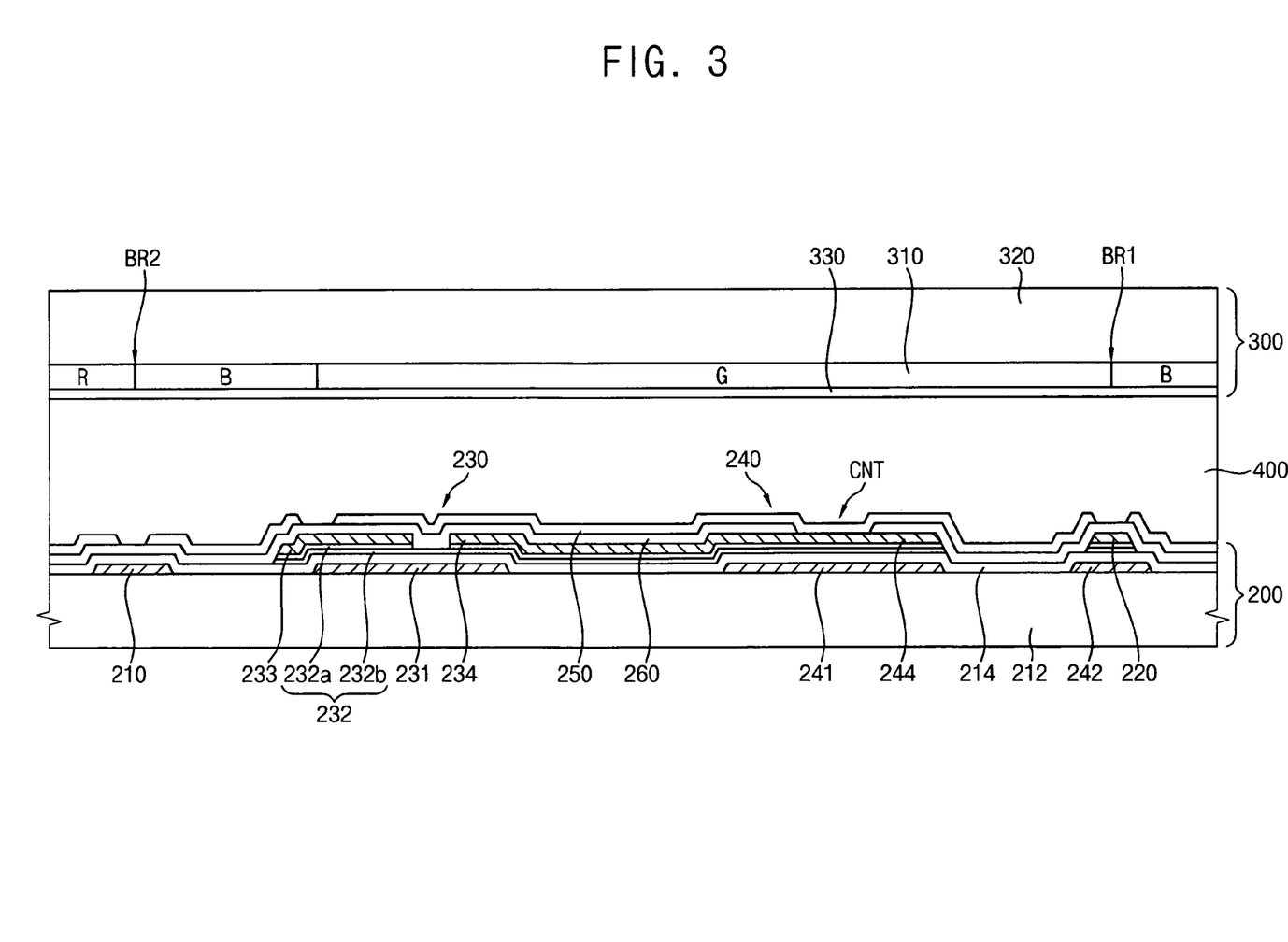
FIG. 3 is a cross-sectional view taken along a line I-I' in FIG. 2.

FIG. 1 is a layout illustrating a portion of a liquid crystal display (LCD) apparatus in accordance with an exemplary embodiment of the present invention. FIG. 2 is an enlarged view illustrating the LCD apparatus of FIG. 1. FIG. 3 is a cross-sectional view taken along a line I-I' in FIG. 2.

Referring FIGS. 1 to 3, an LCD apparatus 100 includes a thin-film transistor (TFT) substrate 200, a color filter substrate 300 and a liquid crystal layer 400.

The TFT substrate 200 includes a gate line 210, a data line 220, a TFT part 230 and a storage capacitor part 240.

The gate line 210, formed in a first conductive layer, is disposed on the insulating substrate 212. The insulating substrate 212 may be a transparent glass substrate. The gate line 210, as shown in FIG. 2, may extend along a substantially horizontal direction on the insulating substrate 212.

A gate insulating layer 214 is disposed on the insulating substrate 212 having the gate line 210 and covers the gate line 210. Examples of an insulating material that can be used for the gate insulating layer 214 include silicon nitride (SiNx), silicon oxide (SiOx). These insulating materials may be used alone or in combination. The thickness of the gate insulating layer 214 may be about 3,000 Å to about 4,500 Å.

The data line 220, formed in a second conductive layer, is disposed on the gate insulating layer 214. The data line 220 is electrically insulated from the gate line 210 by the gate insulating layer 214. The data line 220 extends along a longitudinal or vertical direction crossing the gate line 210 in a zigzag configuration. For example, the data line 220 extends along a substantially longitudinal direction to the gate line 210, then extends along the horizontal direction above the gate line 210 and then, beginning at about the middle of pixel 250, extends again along the longitudinal direction.

A TFT part 230 is electrically connected to the gate line 210 and the data line 220. At least one of the TFT parts 230 is disposed at each pixel. The TFT part 230 applies a data voltage from the data line 220 to the pixel electrode 250 in response to a gate voltage from the gate line 210.

The TFT part 230 includes a gate electrode 231, an active layer 232, a source electrode 233, and a drain electrode 234.

The gate electrode 231 is electrically connected to the gate line 210, and functions as a gate terminal of the TFT.

The active layer 232 is disposed on the gate insulating layer 214 opposite the underlying gate electrode 231. The active layer 232 includes a channel layer 232a and an ohmic contact layer 232b. The channel layer 232a may include amorphous silicon (a-Si), and the ohmic contact layer 232b may include N+ amorphous silicon (N+a-Si) that is formed by implanting N+ impurities into amorphous silicon.

The source electrode 233 is disposed on the active layer 232 to be electrically connected to the data line 220. The source electrode 233 functions as a source terminal of the TFT.

The drain electrode 234 is formed on the active layer 232, and is spaced apart from the source electrode 233. The drain electrode 234 functions as a drain terminal of the TFT.

A portion of the channel layer 232a located between the source electrode 233 and the drain electrode 234, the contact layer 232b having been removed, functions as a channel of the TFT.

The storage capacitor part 240 is formed in each pixel, and functions as a storage capacitor Cst. The storage capacitor part 240 may include first and second lower storage electrodes 241 and 242 and an upper storage electrode 244. The first and second lower storage electrodes 241 and 242 are formed from substantially the same first conductive layer as the gate line 210. The upper storage electrode 244 is formed from substantially the same second conductive layer as the data line 220.

The first lower storage electrode 241 extends in a substantially parallel direction with the gate line 210. A portion of the first lower storage electrode 241 is located beneath the upper storage electrode 244.

The second lower storage electrode 242 extends from the first lower storage electrode 241 toward the data line 220, and extends under a portion of the data line 220. The width of the second lower storage electrode 242 under the data line may be greater than the width of the data line 220. A common voltage may be applied to the first and second lower storage electrodes 241 and 242.

The upper storage electrode 244 is electrically connected to the drain electrode 234 of the TFT part 230. A portion of the upper storage electrode overlays a portion of the first lower storage electrode 241. The gate insulating layer 214 and the active layer 232 may be disposed between the upper storage electrode 244 and the first lower storage electrode 241. The storage capacitor Cst is defined by the upper storage electrode 244 and the first lower storage electrode 241. Alternatively, the active layer 232 may be omitted between the upper storage electrode 244 and the first lower storage electrode 241.

A contact hole CNT is formed in a protecting layer 260 over the upper storage electrode 244. The protecting layer 260 includes a layer of insulating material such as silicon nitride (SiNx) or silicon oxide (SiOx) or other insulating material and may be from about 500 to 2,000 Angstroms thick. The upper storage electrode 244 and the drain electrode 234 are electrically connected to the pixel electrode 250 through the contact hole CNT. Thus, the data voltage applied to the pixel electrode 250 through the TFT is maintained during one frame by the storage capacitor Cst.

The pixel electrodes 250 are disposed on the protecting layer 260.

Each pixel is defined by the gate and data lines 210 and 220 and each pixel electrode occupies an area within a region bounded by two gate lines and two data lines. The pixel electrode 250 includes a transparent conductive material that transmits light. Examples of transparent conductive materials that may be used for the pixel electrode 250 include indium zinc oxide (IZO), indium tin oxide (ITO).

The pixel electrode 250 is electrically connected to the drain electrode 234 and the upper storage electrode 244 through the contact hole CNT formed through the protecting layer 260. The data voltage applied to the pixel electrode 250 through the TFT is maintained during one frame by the storage capacitor Cst.

The pixel electrode 250 may include various features for increasing a viewing angle of the LCD apparatus 100. For example, the pixel electrode 250 may include a main electrode and a sub-electrode. The main electrode and the sub-electrode may receive two different voltages. When the pixel electrode 250 includes a main electrode and a sub-electrode, two TFTs are formed in each pixel, with one of the two TFTs electrically connected to the main electrode and the second of the two TFTs connected to the sub-electrode.

The color filter substrate 300 is disposed close to and attached to the TFT substrate 200. The liquid crystal layer 400 is disposed between the color filter substrate 300 and the TFT substrate 200. The color filter substrate 300 includes color filters 310 having different colors for displaying a color image. The color filters 310 are disposed on an insulating substrate 320. The insulating substrate 320 may be a transparent glass substrate. The color filters 310 may include a photosensitive organic material and pigments corresponding to the colors. The colors may include three colors, red, green and blue. The red, green and blue color filters R, G and B may be disposed in that order and recurring in that order along the horizontal direction of the gate line 210.

The color filters 310 are disposed on the insulating substrate 320 in a uniform arrangement. Since the LCD apparatus 100 has a delta-type pixel structure, the color filters 310 are aligned along the gate line 210 in a horizontal direction, and are aligned along the data line 220 in a zigzag configuration in a longitudinal direction.

The boundaries between rectangular color filters 310 are designated as first boundaries BR1 between the longer or vertical sides of the color filters, and second boundaries BR2 between the shorter horizontal sides of the color filters 310. The ideal locations of these boundaries relative to the TFT substrate 200 are shown by the dotted lines BR1 and BR2 in FIGS. 1 and 2.

The boundaries of the color filters 310 are blocked by various electrodes on the TFT substrate including the gate line 210, the data line 220, the TFT part 230, and the second lower storage electrode 242. Thus a black matrix may be omitted from the areas around the color filter boundaries on the color filter substrate 300. Referring to FIGS. 1 to 3, an aperture ratio may be increased by about 13.4%, and brightness may be enhanced by omitting the black matrix.

This arrangement will now be described in more detail.

The first boundary BR1 between adjacent longer sides of the color filters 310 is ideally aligned as shown by the dotted line BR1 along the center of a vertical portion of the data line 220. In FIGS. 1 to 3, the second lower storage electrode 242 having greater width than the data line 220 is disposed under the data line 220, so that a portion of the first boundary BR1 extending from the point 245 to the point 247 may be effectively blocked by the second lower storage electrode 242. The portion of the first boundary BR1 extending from the point 245 to the point 247 is blocked by the data line 220, the data line 220 being made wider between the point 245 and 247 for the purpose of blocking. The portion of the first boundary BR1 extending from point 246 to point 248 is blocked by a combination of the gate line and the data line.

The second boundary BR2 between adjacent shorter sides of the color filters 310 is ideally aligned as shown by the dotted line BR2 along the center of the gate line 210. In FIGS. 1 to 3, the gate line 210 is sufficiently wide so that the second boundary BR2 may be effectively blocked by the gate line 210.

Since the LCD apparatus 100 in accordance with the first embodiment of the invention has the delta-type pixel structure, the color filters 310 form a third boundary at which three of the color filters 310 having different colors from each other meet. At least one of the third boundaries BR3 is ideally located relative to the TFT substrate 200, as shown in FIG. 2, next to the TFT part 230. The combination of the gate electrode, the source electrode and the drain electrode of the TFT part 230 has a greater width than the data line 220 and the gate line 210. Thus, the TFT part 230 may block the third boundary BR3 at which the three of the color filters 310 meet.

The color filter substrate 300 may further include a common electrode 330 opposite to the pixel electrode 250. The liquid crystal layer 400 is disposed between the pixel electrode 250 and the common electrode 330. The common electrode 330 includes a conductive transparent material that transmits light. Examples of the conductive transparent material that may be used for the common electrode 330 include indium zinc oxide (IZO), and indium tin oxide (ITO). The common electrode 330 may include substantially the same material as the pixel electrode 250. The common electrode 330 may include patterns of openings for increasing the viewing angle.

Liquid crystal molecules in the liquid crystal layer 400 have optical and electric characteristics such as an anisotropic index of refraction and an anisotropic dielectric constant. The liquid crystal molecules in the liquid crystal layer 400 may be arranged in a constant direction. An arrangement of the liquid crystal molecules in the liquid crystal layer 400 is changed by an electric field formed between the pixel electrode 250 and the common electrode 330. When the arrangement of the liquid crystal molecules in the liquid crystal layer 400 is changed, light transmittance is controlled.

Figure 4:
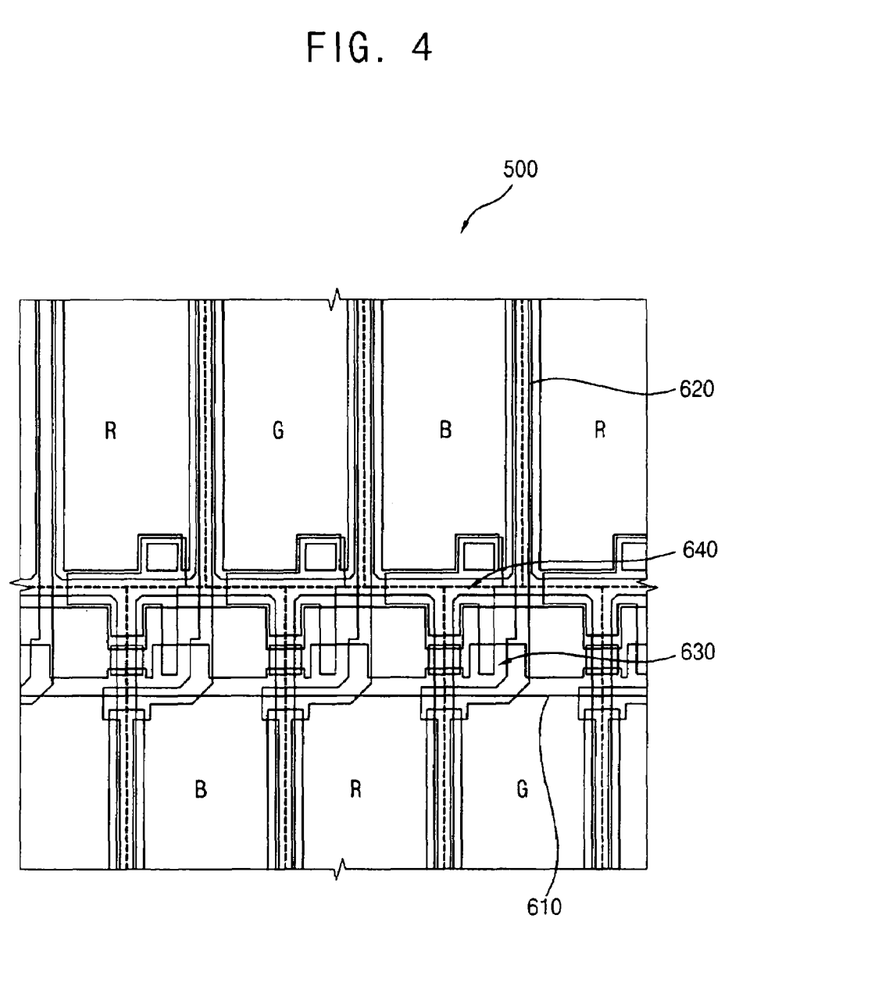
FIG. 4 is a layout illustrating a portion of an LCD apparatus in accordance with another exemplary embodiment of the present invention.
Figure 5:
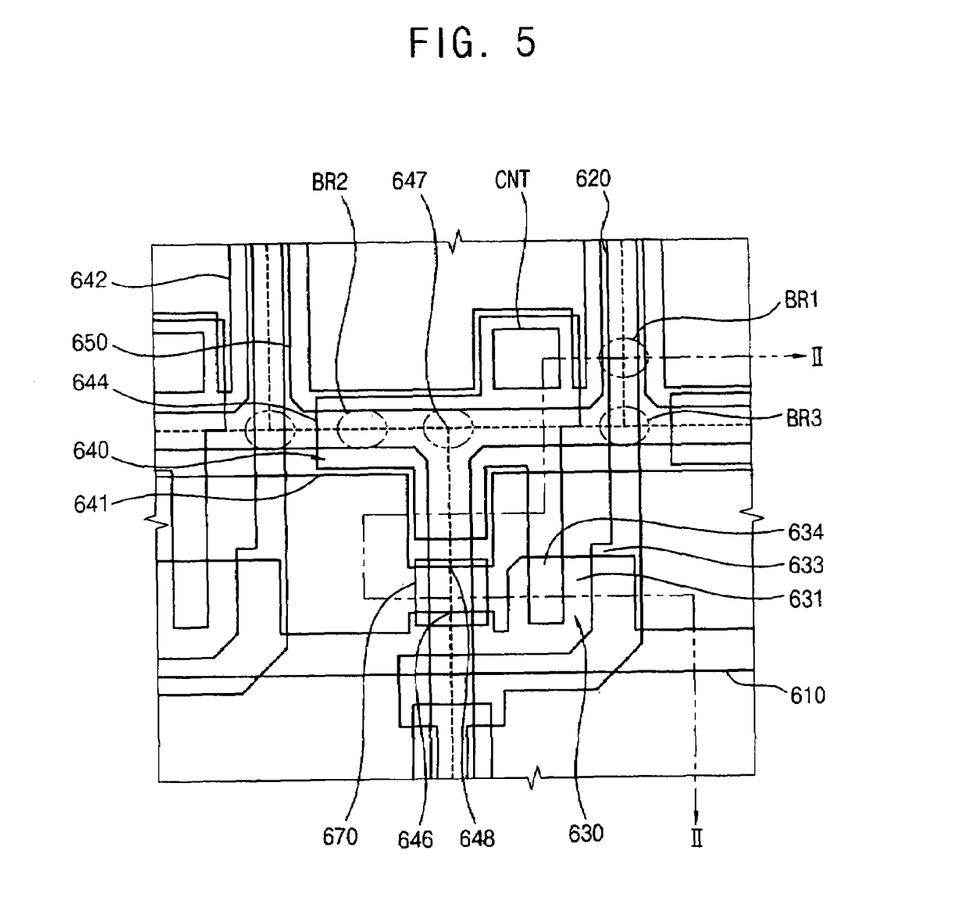
FIG. 5 is an enlarged view illustrating the LCD apparatus of FIG. 4.
Figure 6:
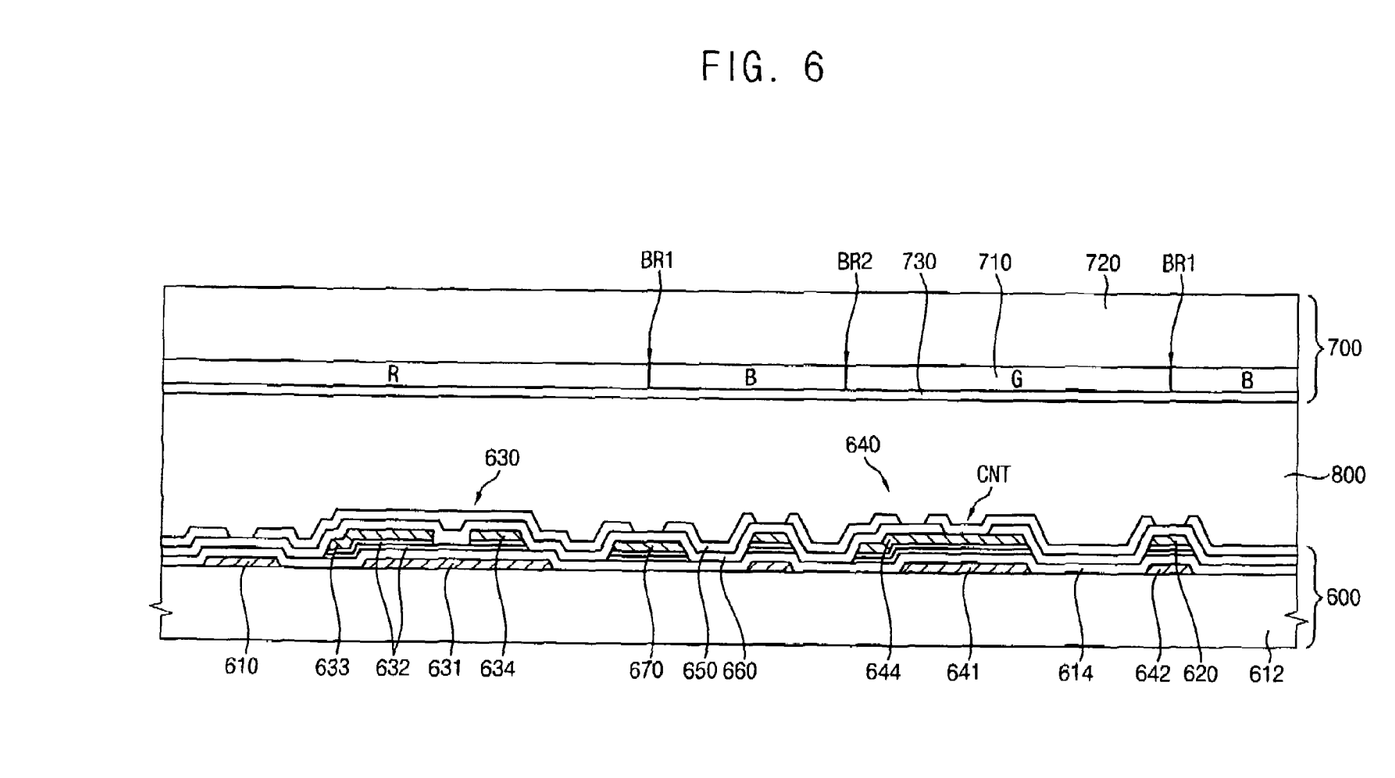
FIG. 6 is a cross-sectional view taken along a line II-II' in FIG. 5.

FIG. 4 is a layout illustrating a portion of an LCD apparatus in accordance with another exemplary embodiment of the present invention. FIG. 5 is an enlarged view illustrating the LCD apparatus of FIG. 4. FIG. 6 is a cross-sectional view taken along a line II-II' in FIG. 5.

Referring to FIGS. 4 to 6, an LCD apparatus 500 includes a TFT substrate 600, a color filter substrate 700 and a liquid crystal layer 800.

The TFT substrate 600 includes a gate line 610 formed in a first conductive layer, a data line 620 formed in a second conductive layer, a TFT part 630 and a storage capacitor part 640. The data line 620 is electrically insulated from the gate line 610 through an insulating layer 614, and intersects the gate line 610.

The gate line 610, the gate insulating layer 614 and the data line 620 are substantially the same as those in FIGS. 2 and 3. Thus, any further detailed description concerning the elements will be omitted.

The TFT part 630 includes a gate electrode 631, an active layer 632, a source electrode 633 and a drain electrode 634. The gate electrode 631 is electrically connected to the gate line 610. The active layer 632 is formed on the gate insulating layer and after etch patterning a portion of the active layer remains above the gate electrode 631. The source electrode 633 is disposed on the active layer 632, and is electrically connected to the data line 620. The drain electrode 634 is disposed on the active layer 632, and is spaced apart from the source electrode 633.

The TFT part 630 is substantially the same as that in FIGS. 2 and 3. Thus, any further detailed description of the TFT part will be omitted.

The storage capacitor part 640 may include first and second lower storage electrodes 641 and 642 and an upper storage electrode 644. The first and second lower storage electrodes 641 and 642 are formed from substantially the same first conductive layer as the gate line 610. The upper storage electrode 644 is formed from substantially the same second conductive layer as the data line 620.

The first lower storage electrode 641 is located under the upper storage electrode 644.

The second lower storage electrode 642 extends from the first lower storage electrode 641 towards the data line 620, and extends under the data line 620. The second lower storage electrode 642 has a greater width than the data line 620. A common voltage may be applied to the first and second lower storage electrodes 641 and 642.

The upper storage electrode 644 is electrically connected to the drain electrode 634 of the TFT part 630, and overlays the first lower storage electrode 641. The upper storage electrode 644 and the first lower storage electrode 641 define the storage capacitor Cst. The gate insulating layer 614 and the active layer 632 are interposed between the upper storage electrode 644 and the first lower storage electrode 641. Alternatively, the active layer 632 may be omitted.

The pixel electrode 650 corresponds to each pixel defined by the first lower storage electrode 641 and the data line 620, and is formed on a protecting layer 660. The pixel electrode 650 is electrically connected to the drain electrode 634 and the upper storage electrode 644 through a contact hole CNT formed through the protecting layer 660.

The pixel electrode 650 is substantially the same as the pixel electrode 250 shown in FIGS. 2 and 3 except for its location Thus, any further detailed explanation concerning this element will be omitted.

The color filter substrate 700 is opposite to the TFT substrate 600, and is combined with the TFT substrate 600 with the liquid crystal layer 800 located in the space between the filter substrate 700 and the TFT substrate 600. The color filter substrate 700 includes the insulating substrate 720, and the color filters 710 provided on the insulating substrate 720 and having different colors for displaying a color image. For example, the color filters 710 include red, green and blue color filters R, G and B alternately arranged along the extension direction of the first lower storage electrode 641. The extension direction of the first lower storage electrode 641 may be the horizontal direction.

The LCD apparatus 500 in accordance with the present invention has a delta-type pixel structure. Thus, the color filters 710 are arranged along the first lower storage electrode 641 as a linear shape in the horizontal direction, and are arranged along the data line 620 in a zigzag configuration in the longitudinal direction.

The boundaries between the color filters 710 are designated as first boundaries BR1 between the longer vertical sides of the color filters 710, and second boundaries BR2 between the shorter horizontal edges of the color filters 710. The ideal locations of these boundaries relative to the TFT substrate 600 are shown by the dotted lines BR1 and BR2 in FIGS. 4 and 5.

As shown by the dotted lines BR1 and BR2 in FIG. 5, the boundaries of the color filters 710 having different colors are intended to be blocked by storage capacitor part 640. The storage capacitor part 640 formed at the TFT substrate 600 blocks the boundary of the color filters 710, except for a small portion of the boundary that is blocked by other electrodes as described in more detail in the next paragraph. With the boundaries of the color filters blocked by the storage capacitor and other electrodes a black matrix (not shown) is omitted from the color filter substrate 700. Thus, the aperture ratio may be increased by about 16.3% compared with an LCD apparatus having a color filter substrate including a black matrix. Also, the aperture ratio of the LCD apparatus having the storage capacitor part 640 that blocks most of the boundary of the color filters 710 may be greater than an aperture ratio of an LCD apparatus of the first exemplary embodiment of the invention having a gate line, a data line and a TFT part that block the boundary of the color filters.

The first boundary BR1 between adjacent longer sides of the color filters 710 is ideally aligned as shown by the dotted line BR1 with the center of a vertical portion of the data line 620. The second lower storage electrode 642 has a greater width than the data line 620 and is disposed under the data line 620 so that a portion of the first boundary BR1 as shown in FIG. 5, may be effectively blocked by the second lower storage electrode 642. A portion of the first lower storage electrode 641 extends along the first boundary BR1 and blocks the first boundary BR1 from the point 647 to the point 648. A floating electrode 670 blocks the first boundary from the point 648 to the point 646.

The second boundary BR2 between adjacent shorter sides of the color filters 710 is ideally aligned with the first lower storage electrode 641 and the upper storage electrode 644 as shown by the dotted line BR2 in FIG. 5. In FIGS. 4 to 6, the first lower storage electrode 641 and the upper storage electrode 644 have a greater width than the gate line 610 and the data line 620, so that the second boundary BR2 may be effectively blocked by the first storage electrode 641 and the upper storage electrode 644.

Since the LCD apparatus 500 in accordance with the present invention has delta-type pixel structure, the color filters 710 form third boundaries BR3 at which three of the color filters 710 having different colors meet. A first one of the third boundaries BR3 is shown in FIG. 5 as ideally placed over the lower storage electrode 641 and the upper storage electrode 644. A second one of the third boundaries BR3 is shown in FIG. 5 as ideally disposed in a region in which the first lower storage electrode 641 is connected to the second lower storage electrode 642.

The first one of the third boundaries BR3 at which the three of the color filters 710 meet may be effectively blocked by the first lower storage electrode 641 and the upper storage electrode 644. The first lower storage electrode 641 and the upper storage electrode 644 have greater widths than the gate line 610 and the data line 620.

The second one of the third boundaries BR3 may be effectively blocked by the region in which the first lower storage electrode 641 is connected to the second lower storage electrode 642.

As noted above the TFT substrate 600 may include a floating electrode 670. The floating electrode 670 may block a portion of the first boundary BR1 which is not otherwise blocked. The floating electrode 670 is disposed between the first lower storage electrode 641 and the gate line 610, and is disposed between the upper storage electrode 644 and the data electrode 620. The floating electrode 670 may be formed from substantially the same second conductive layer as the upper storage electrode 644 and the data electrode 620. No voltage is applied to the floating electrode 670.

The color filter 700 may further include a common electrode 730 opposite to the pixel electrode 650. The liquid crystal layer 800 is interposed between the common electrode 730 and the pixel electrode 650. The common electrode 730 and the liquid crystal layer 800 are substantially the same as that of FIG. 3. Thus, any further detailed explanation concerning these elements will be omitted.

In the first exemplary embodiment of the present invention, a gate line, a data line, a storage capacitor electrode, and a TFT part, all located on a TFT substrate block light leakage at the boundaries of color filters on a color filter substrate so that a black matrix may be omitted from the color filter substrate. Thus, an aperture ratio and brightness of the LCD apparatus having a delta-type pixel structure may be increased.

In the second embodiment of the present invention, light leakage at the boundaries of the color filters may be blocked by a storage capacitor part, a gate line, a data line and a floating electrode, all located on a TFT substrate, so that the aperture ratio may be greatly increased.

Although exemplary embodiments of the present invention have been described herein with reference to the accompanying drawings, it is to be understood that the present invention should not be limited to those precise embodiments and that various other changes and modifications may be made by one of ordinary skill in the related art without departing from the scope or spirit of the invention. All such changes and modifications are intended to be included within the scope of the invention as defined by the appended claims.

What is claimed is:

1. A liquid crystal display (LCD) apparatus comprising:
   a thin-film transistor (TFT) substrate including a gate line, a data line extended along a direction intersecting the gate line, a TFT part electrically connected to the gate line and the data line, and a storage capacitor part, the gate line being electrically insulated from the data line;
   a color filter substrate including color filters of a plurality of colors, a boundary at which adjacent ones of the color filters meet being overlapped with the TFT part; and
   a liquid crystal layer disposed between the TFT substrate and the color filter substrate.

2. The LCD apparatus of claim 1, wherein the color filters are arranged along the gate line in a linear shape and are arranged along the data line in a zigzag configuration.

3. The LCD apparatus of claim 1, wherein the boundary at which adjacent ones of the color filters meet is overlapped with the gate line and/or the data line.

4. The LCD apparatus of claim 3, wherein each of the color filters has a rectangular shape having first sides substantially parallel with the data line and second sides substantially parallel with the gate line, the first sides of adjacent ones of the color filters meeting at a first boundary of the color filters, and the first boundary being overlapped with the data line.

5. The LCD apparatus of claim 4, wherein the second sides of adjacent ones of the color filters meet at a second boundary of the color filters, and the second boundary is overlapped with the gate line.

6. The LCD apparatus of claim 5, wherein three adjacent ones of the color filters meet at a third boundary of the color filters, and the third boundary is overlapped with the TFT part.

7. The LCD apparatus of claim 3, wherein the color filters comprise red, green and blue color filters alternately arranged along an extension direction of the gate line.

8. The LCD apparatus of claim 3, wherein the TFT substrate further comprises a pixel electrode electrically connected to the TFT part, and the color filter substrate further comprises a common electrode opposite to the pixel electrode so that the liquid crystal layer is interposed between the pixel electrode and the common electrode.

9. An LCD apparatus comprising:
   a TFT substrate including a gate line, a data line intersecting the gate line, a TFT part electrically connected to the gate line and the data line, and a storage capacitor part, the gate line being electrically insulated from the data line;
   a color filter substrate including color filters of a plurality of colors, a boundary of the color filter being overlapped with the storage capacitor part; and
   a liquid crystal layer disposed between the TFT substrate and the color filter substrate.

10. The LCD apparatus of claim 9, wherein the boundary at which adjacent ones of the color filters meet is overlapped with the gate line and/or the data line.

11. The LCD apparatus of claim 9, wherein the color filters are arranged along the gate line in a linear shape, and are arranged along the data line in a zigzag configuration.

12. The LCD apparatus of claim 10, wherein the storage capacitor part comprises:
    a first lower storage electrode formed from substantially a same layer as the gate line, and disposed along the gate line substantially in parallel;
    a second lower storage electrode formed from substantially the same layer as the gate line, and extended from the first lower storage electrode toward the data line to be overlapped with the data line; and
    an upper storage electrode formed from substantially a same layer as the data line, and electrically connected to a drain electrode of the TFT part, the upper storage electrode being overlapped with the first lower storage electrode.

13. The LCD apparatus of claim 12, wherein each of the color filters has a rectangular shape having first sides substantially parallel with the data line and second sides substantially parallel with the gate line, the first sides of adjacent ones of the color filters meet at a first boundary of the color filters, and the first boundary is overlapped with the data line and the second lower storage electrode.

14. The LCD apparatus of claim 13, wherein a width of the second lower storage electrode is greater than that of the data line.

15. The LCD apparatus of claim 13, wherein the second sides of the adjacent ones of the color filters meet at a second boundary of the color filters, and the second boundary is overlapped with the upper storage electrode.

16. An LCD apparatus of claim 13, wherein three adjacent ones of the color filters meet at a third boundary of the color filters, and the third boundary is overlapped with the first lower storage electrode and the upper storage electrode.

17. The LCD apparatus of claim 13, wherein three adjacent ones of the color filters meet at a third boundary of the color filters, and the third boundary is disposed at an area at which the first lower storage electrode makes contact with the second lower storage electrode.

18. The LCD apparatus of claim 13, wherein the TFT substrate further comprises a floating electrode formed between the data line and the upper storage electrode to cover an exposed portion of the first boundary.

19. The LCD apparatus of claim 12, wherein the color filters comprises red, green and blue color filters alternately arranged along an extension direction of the first lower storage electrode.

20. The LCD apparatus of claim 12, wherein the TFT substrate further comprises a pixel electrode connected to the TFT part, and the color filter substrate further comprises a common electrode opposite to the pixel electrode so that the liquid crystal layer is interposed between the pixel electrode and the common electrode.

* * * * *